US011007962B2

(12) United States Patent
Davis et al.

(10) Patent No.: US 11,007,962 B2
(45) Date of Patent: May 18, 2021

(54) STRUCTURAL TUBE CONNECTION DEVICE FOR A VEHICLE ROLL OVER PROTECTION SYSTEM

(71) Applicant: Mahindra N.A. Tech Center, Auburn Hills, MI (US)

(72) Inventors: Jeffrey S. Davis, Brighton, MI (US); Kenneth R. Elliott, Richmond, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 124 days.

(21) Appl. No.: 16/296,422

(22) Filed: Mar. 8, 2019

(65) Prior Publication Data

US 2020/0282936 A1     Sep. 10, 2020

(51) Int. Cl.
*B60R 21/13*     (2006.01)
*B60R 21/00*     (2006.01)

(52) U.S. Cl.
CPC ...... *B60R 21/13* (2013.01); *B60R 2021/0018* (2013.01)

(58) Field of Classification Search
CPC ............ B60R 21/13; B60R 2021/0018; B60R 2021/137; B60R 21/131; E02F 9/163; B62D 65/02
USPC ....................................................... 280/756
See application file for complete search history.

(56) References Cited

U.S. PATENT DOCUMENTS

| 5,622,382 | A | 4/1997 | Zepnik et al. | |
|---|---|---|---|---|
| 8,979,123 | B1* | 3/2015 | Takahashi | B62D 23/005 280/756 |
| 9,045,104 | B2 | 6/2015 | Kuroda et al. | |
| 2009/0301830 | A1* | 12/2009 | Kinsman | B62D 5/04 188/289 |
| 2011/0079620 | A1* | 4/2011 | Todorovic | B60R 9/00 224/309 |
| 2011/0248488 | A1 | 10/2011 | Duenchel et al. | |

(Continued)

FOREIGN PATENT DOCUMENTS

DE     2327349 A1 * 12/1974     ............ B60R 21/13
JP     6453651 B2 *  1/2019

OTHER PUBLICATIONS

Machine Translation of DE-2327349-A1 (Year: 1974).*
International Search Report and Written Opinion dated May 22, 2020 for Application No. PCT/US2020/014729.

*Primary Examiner* — James A English
*Assistant Examiner* — Kurtis Nielson
(74) *Attorney, Agent, or Firm* — Harness, Dickey & Pierce, P.L.C.

(57) ABSTRACT

A vehicle roll over protection system with at least one hoop member, longitudinal member, and connection device. The connection device couples the longitudinal member to the hoop member and includes first and second side plates that are fixedly attached on opposing sides of the hoop member in a substantially parallel arrangement to define a channel between the first and second side plates. Each side plate includes a cut-out that forms a cradle. The longitudinal member is received in the cradle. One or more wing plates are fixed to the longitudinal member. The wing plate(s) are received in the channel between the first and second side plates such that the first and second side plates act as displacement limiting features that limit the displacement of the longitudinal member relative to the hoop member in multiple directions.

20 Claims, 9 Drawing Sheets

(56) References Cited

U.S. PATENT DOCUMENTS

| | | | |
|---|---|---|---|
| 2013/0049339 A1 | 2/2013 | Kwon et al. | |
| 2014/0292039 A1* | 10/2014 | Kuroda | B60R 21/13 |
| | | | 296/203.01 |
| 2017/0166255 A1* | 6/2017 | Peterson | B62D 21/11 |
| 2018/0178677 A1* | 6/2018 | Swain | B62D 21/183 |
| 2018/0304819 A1 | 10/2018 | Burton | |
| 2019/0009823 A1* | 1/2019 | Savard | B62D 21/183 |
| 2019/0031260 A1* | 1/2019 | Filion | B62D 65/024 |
| 2019/0054881 A1* | 2/2019 | Schmitt | B60R 21/13 |
| 2019/0232911 A1* | 8/2019 | Hisamura | B62D 27/02 |

* cited by examiner

STRUCTURAL TUBE CONNECTION DEVICE FOR A VEHICLE ROLL OVER PROTECTION SYSTEM

FIELD

The present disclosure relates generally to vehicle roll over protection systems such as roll bars and roll cages. More particularly, the present disclosure relates to a structural tube connection device for a vehicle roll over protection system.

BACKGROUND

This section provides background information related to the present disclosure which is not necessarily prior art.

Many vehicles are equipped with vehicle roll over protection systems such as roll hoops, roll bars, and roll cages. These vehicle roll over protection systems generally improve the rigidity of the vehicle, particularly around the passenger compartment, and therefore can reduce damage to the vehicle during a roll over event. Vehicle roll over protection systems are commonly installed in off-road vehicles and vehicles used in competitive racing due to the higher likelihood of roll over events associated with such activities. However, vehicle roll over protection systems are also fitted to a wide range of other vehicles including automobiles, trucks, construction equipment, and tractors.

Vehicle roll over protection systems are typically made from sections of metal tubing that are welded together to form a roll hoop or roll cage. Due to dimensional variations between different vehicles, even across vehicles of the same model type, roll hoops and roll cages are often customized or adjusted to fit each particular vehicle on a one-off basis. This in combination with the requirements for welding equipment makes the installation of traditional vehicle roll over protection systems difficult in assembly line manufacturing environments. Accordingly, there remains a need for vehicle roll over protection systems that can be manufactured more efficiently and be installed on a vehicle assembly line without the need for additional welding operations.

SUMMARY

This section provides a general summary of the disclosure, and is not a comprehensive disclosure of its full scope or all of its features.

In accordance with an aspect of the present disclosure, a vehicle roll over protection system is provided with at least one hoop member, longitudinal member, and connection device. The connection device is configured to couple the longitudinal member to the hoop member. The connection device includes first and second side plates that are fixedly attached on opposing sides of the hoop member in a substantially parallel arrangement. As a result, a channel is created between the first and second side plates. Each of the first and second side plates includes a cut-out that forms a cradle in the connection device. The longitudinal member is received in the cradle of the connection device. The longitudinal member includes one or more wing plates that are fixed to the longitudinal member. The wing plate(s) of the longitudinal member are received in the channel between the first and second side plates. As a result of this arrangement, the first and second side plates are displacement limiting features that limit the displacement of the longitudinal member relative to the hoop member in multiple directions.

Advantageously, the vehicle roll over protection system disclosed herein is easy to assemble, and if necessary, disassemble. The vehicle roll over protection system of the present disclosure is therefore well-suited for assembly-line manufacturing environments and welding operations are not required to install the vehicle roll over protection system into a vehicle. Additionally, the connection device is configured such that the first and second side plates bear the shear forces caused by relative movement between the hoop member and the longitudinal member and therefore does not rely on the shear strength of fasteners to resist shear force loads.

BRIEF DESCRIPTION OF THE DRAWINGS

Other advantages of the present disclosure will be readily appreciated, as the same becomes better understood by reference to the following detailed description when considered in connection with the accompanying drawings wherein.

DESCRIPTION OF THE ENABLING EMBODIMENT

Figure 1:
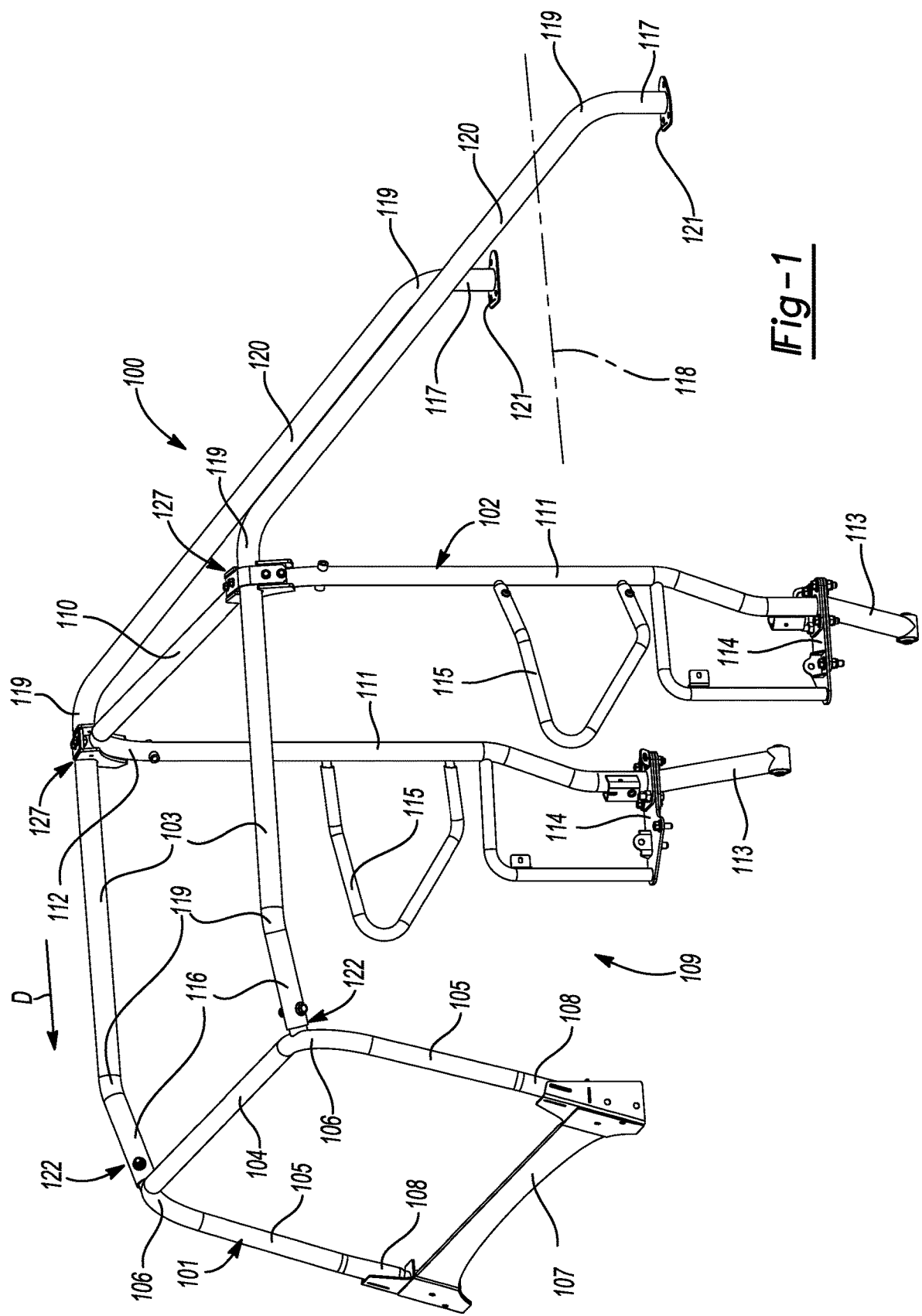
FIG. 1 is a side perspective view of an exemplary vehicle roll over protection system that has been constructed in accordance with the teachings of the present disclosure.

Referring to the Figures, wherein like numerals indicate corresponding parts throughout the several views, several vehicle roll over protection systems 100, 200, 300 are disclosed.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. Additionally, the terms "substantially parallel" and "substantially perpendicular" as used herein is meant to cover dimensional variances of plus or minus 5 degrees.

Referring to FIG. 1, a vehicle roll over protection system 100 is shown comprising an A-pillar hoop member 101, a B-pillar hoop member 102, and two longitudinal members 103. The A-pillar hoop member 101 includes a forward cross-bar 104 that extends between two A-pillar stanchions 105. Although other configurations are possible, the forward cross-bar 104 and the A-pillar stanchions 105 are made from a single metal tube that includes bent sections 106 where the forward cross-bar 104 transitions to the A-pillar stanchions 105. The A-pillar hoop member 101 also includes a base assembly 107 that is rigidly connected to bottom ends 108 of the A-pillar stanchions 105. The base assembly 107 is configured to be rigidly connected to a vehicle (not shown) by bolts or other fasteners at a location just forward of the dash (not shown) and the front door openings 109. As a result, the windshield (not shown) of the vehicle may be bounded (i.e., framed) by the A-pillar stanchions 105, the forward cross-bar 104, and the base assembly 107 of the A-pillar hoop member 101.

The B-pillar hoop member 102 includes a middle cross-bar 110 that extends between two B-pillar stanchions 111. Although other configurations are possible, the middle cross-bar 110 and the B-pillar stanchions 111 are made from a single metal tube that includes bent corners 112 where the middle cross-bar 110 transitions to the B-pillar stanchions 111. The B-pillar stanchions 111 extend from the bent corners 112 to lower ends 113 that include lower mounts 114. The lower mounts 114 are configured to be rigidly connected to the vehicle by bolts or other fasteners at a location adjacent to the first row of passenger seats (not shown) and behind the front door openings 109. For example, the lower mounts 114 of the B-pillar hoop member 102 may be configured to be bolted to the body, floor, or frame of the vehicle. The B-pillar hoop member 102 may optionally include hoop projections 115 that extend longitudinally from the B-pillar stanchions 111 into the front door openings 109 and/or provisions for attaching seat belts, harnesses, or side windows.

Each longitudinal member 103 of the vehicle roll over protection system 100 extends between a forward end 116 and an aft end 117. It should be appreciated that the longitudinal members 103 extend in a fore/aft direction D relative to the vehicle generally. This does not mean that the longitudinal members 103 have to be straight or arranged parallel to a center line 118 of the vehicle at all points. For example, in the illustrated embodiment, each longitudinal member 103 includes multiple bends 119 and has a downwardly sloping aft portion 120 that extends between the B-pillar hoop member 102 and the aft end 117. The aft ends 117 of the longitudinal members 103 have feet 121 that are configured to be rigidly connected to the vehicle by bolts or other fasteners at a location behind the first row of passenger seats. For example, the feet 121 at the aft ends 117 of the longitudinal members 103 may be configured to be bolted to the body, floor, cargo bed, or frame of the vehicle.

Figure 2:
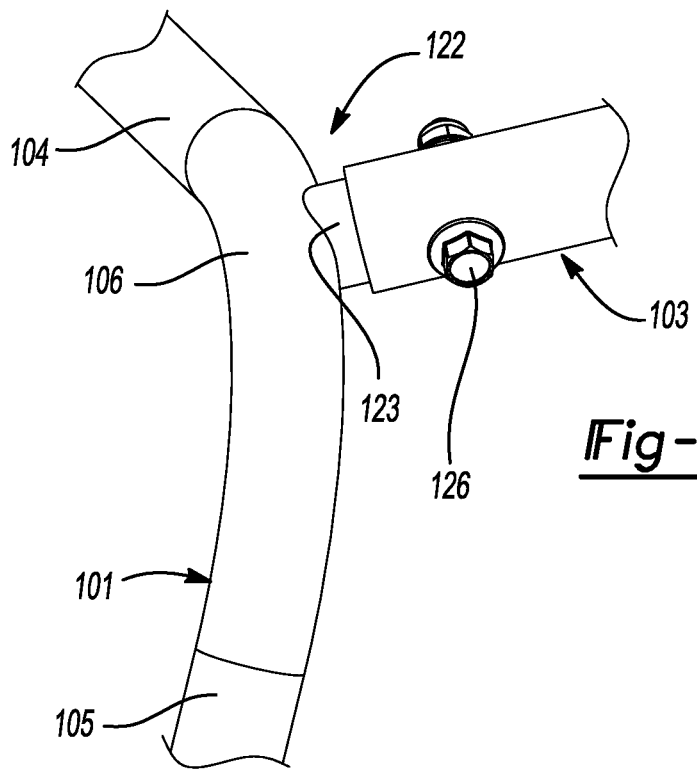
FIG. 2 is a side perspective view of an exemplary slip connection of the vehicle roll over protection system shown in FIG. 1.
Figure 3:
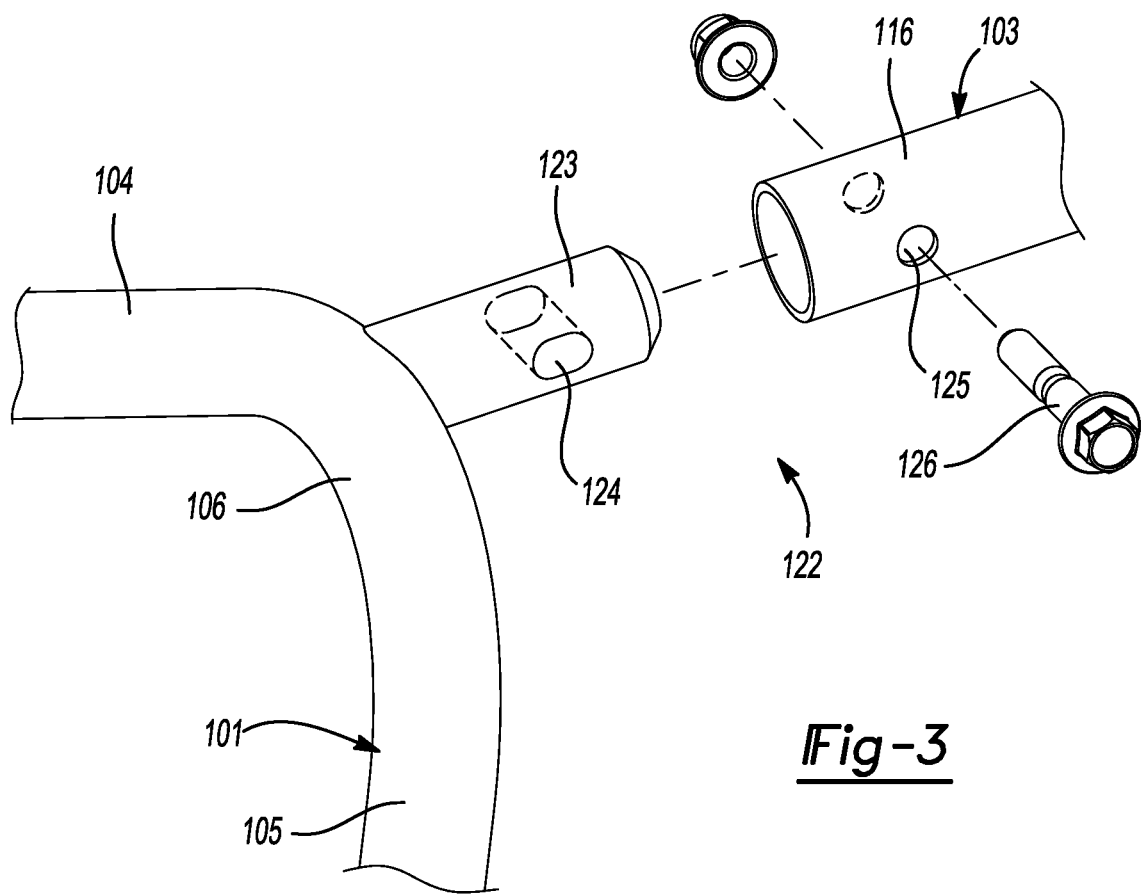
FIG. 3 is an exploded perspective view of the exemplary slip connection shown in FIG. 2.

With additional reference to FIGS. 2 and 3, a slip connection 122 couples the forward end 116 of each longitudinal member 103 to the A-pillar hoop member 101. Each slip connection 122 includes a post 123 that is fixed to the A-pillar hoop member 101. Although other configurations are possible, in the illustrated embodiment, the posts 123 extend out from the bent sections 106 of the A-pillar hoop member 101 towards the front door openings 109 and are received in the forward ends 116 of the longitudinal members 103 in a slip fit. Each post 123 includes an elongated post hole 124 and the forward end 116 of each longitudinal member 103 includes a cross-bore 125 that is aligned with the elongated post hole 124. Forward fasteners 126 extend through both the cross-bores 125 in the longitudinal members 103 and the elongated post holes 124 to couple the forward ends 116 of the longitudinal members 103 to the A-pillar hoop member 101. The elongated post holes 124 have an oval-like shape, which permits limited movement where the longitudinal members 103 can slide on the posts 123 a short distance. It should be appreciated that this arrangement can be reversed, where the post holes 124 are circular and the cross-bores 125 in the forward ends 116 of the longitudinal members 103 have an elongated, oval shape.

Figure 4:
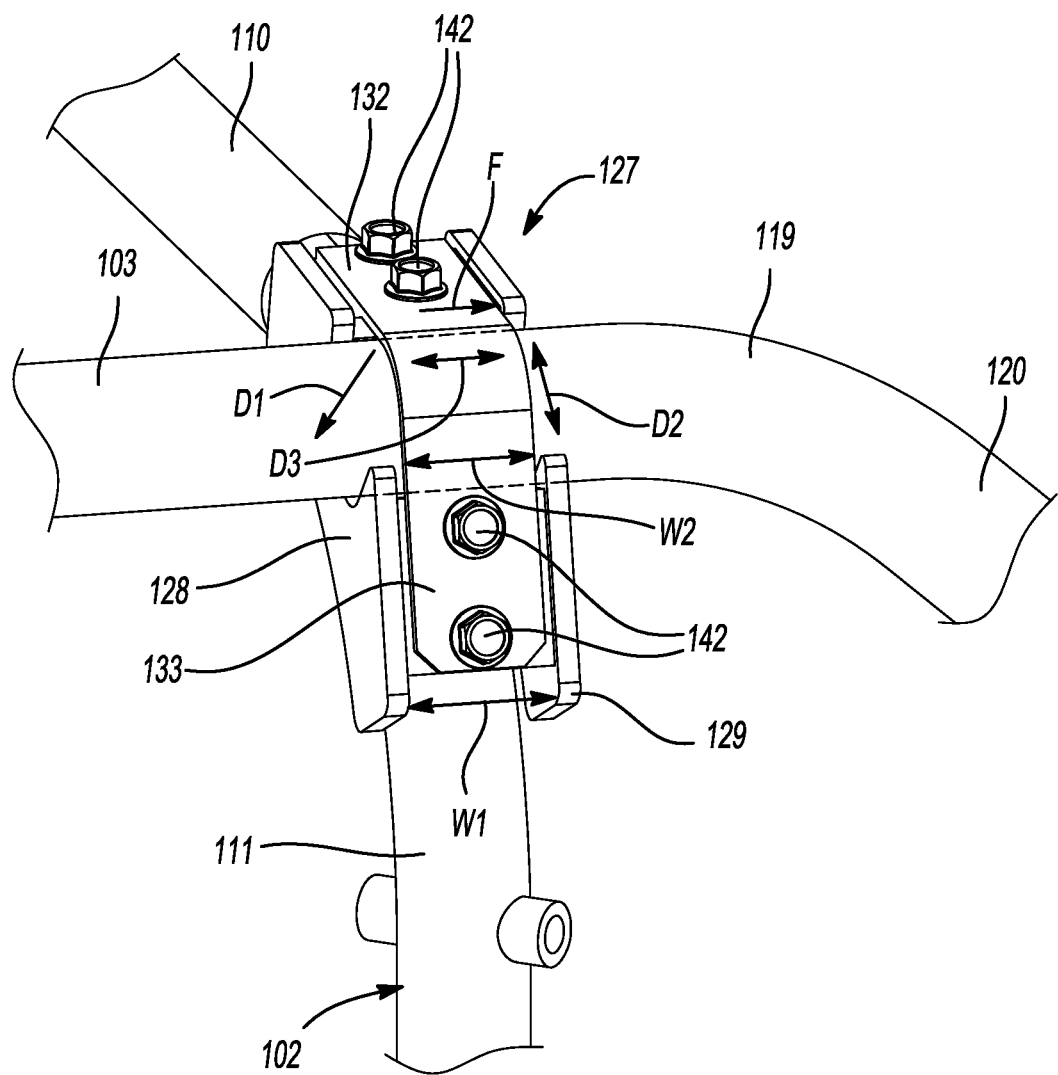
FIG. 4 is a side perspective view of an exemplary connection device of the vehicle roll over protection system shown in FIG. 1.
Figure 5:
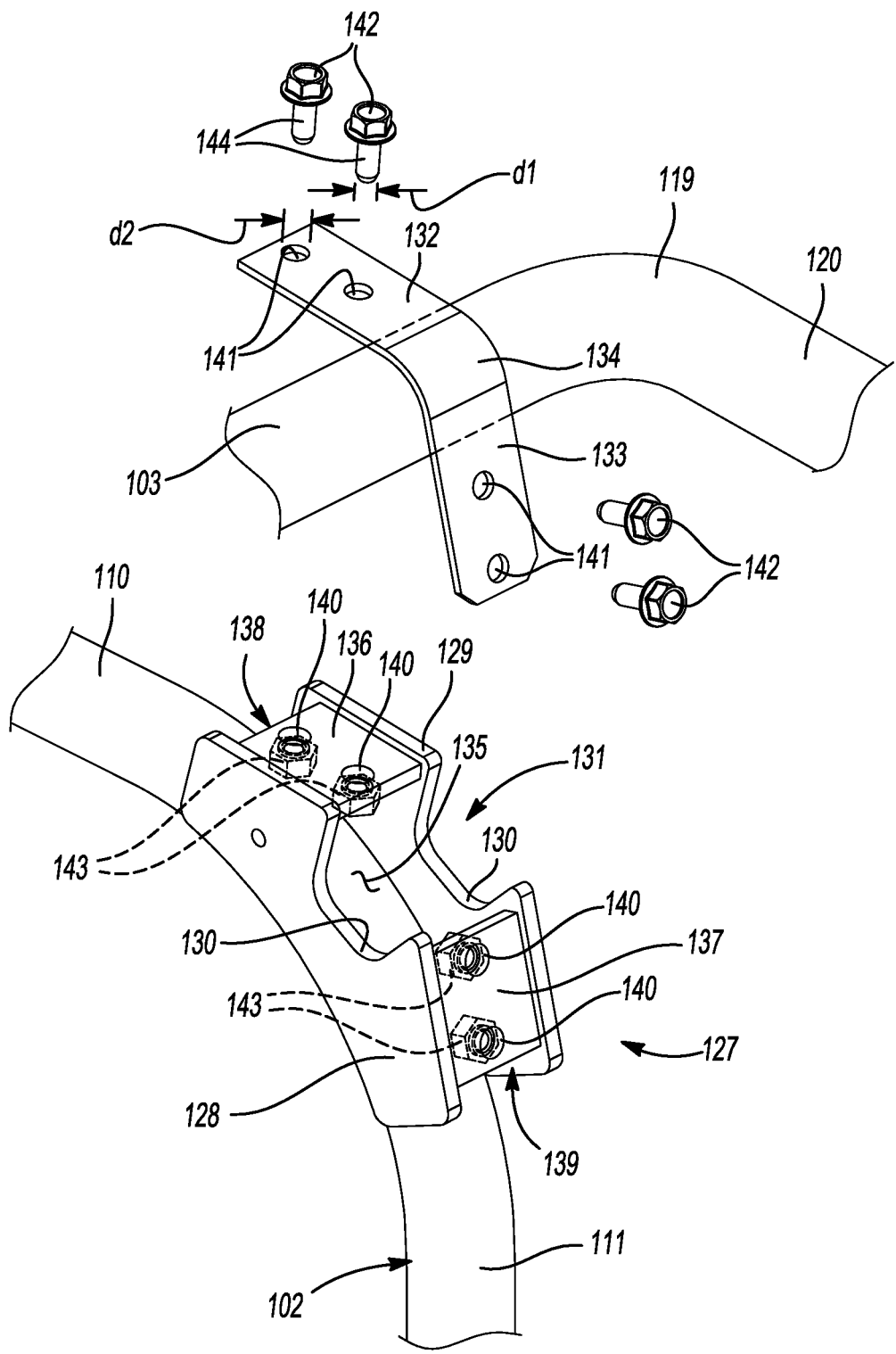
FIG. 5 is an exploded perspective view of the exemplary connection device shown in FIG. 4.

With additional reference to FIGS. 4 and 5, a first pair of connection devices 127 couple the longitudinal members 103 to the B-pillar hoop member 102 at locations between the forward and aft ends 116, 117 of the longitudinal members 103. Each connection device in the first pair of connection devices 127 includes first and second side plates 128, 129 that are fixedly attached on opposing sides of the B-pillar hoop member 102 in a substantially parallel arrangement. In other words, a portion of the metal tube forming the B-pillar hoop member 102 is sandwiched between the first and second side plates 128, 129. Although other configurations are possible, in the illustrated embodiment, the first and second side plates 128, 129 of the first pair of connection devices 127 are welded to the B-pillar hoop member 102 at the bent corners 112 between the middle cross-bar 110 and the B-pillar stanchions 111.

Each of the first and second side plates 128, 129 includes a cut-out 130 that forms a cradle 131. As will be discussed in greater detail below, each cradle 131 is configured to receive one of the longitudinal members 103. The cradles 131 act as displacement limiting features that limit the displacement of the longitudinal member 103 relative to the B-pillar hoop member 102 in multiple directions D1 and D2 in addition to limiting rotation of the longitudinal members 103 relative to the B-pillar hoop member 102. Each longitudinal member 103 includes first and second wing plates 132, 133 that extend outwardly from the longitudinal member 103 in different planes. The first and second wing plates 132, 133 are fixed to the longitudinal member 103. Although other configuration are possible, in the illustrated example, the first and second wing plates 132, 133 are formed by a metal strap 134 that is bent and welded onto the longitudinal member 103.

As best seen in FIG. 5, a channel 135 is defined between the first and second side plates 128, 129. The first and second wing plates 132, 133 of the longitudinal member 103 are received in the channel 135 between the first and second side plates 128, 129. The first and second side plates 128, 129 constrain movement of the first and second wing plates 132, 133. When the first and second wing plates 132, 133 contact the first and second side plates 128, 129, the first and second side plates 128, 129 act as displacement limiting features that limit the displacement of the longitudinal member 103 relative to the B-pillar hoop member 102 in multiple directions D2 and D3 in addition to limiting rotation of the longitudinal members 103 relative to the B-pillar hoop member 102. While each longitudinal member 103 in the illustrated example includes two wing plates 132, 133, it should be appreciated that other configurations are possible to utilize a single wing plate that is received in the channel 135 of the connection device 127. The wing plate(s) 132, 133 are substantially perpendicular to each longitudinal member 103 and therefore form a cross (X) or (T) shape with the longitudinal member 103.

Each connection device in the first pair of connection devices 127 includes first and second support plates 136, 137 that extend between the first and second side plates 128, 129 on opposing sides of the cradle 131. The first and second support plates 136, 137 are fixed and substantially perpendicular to the first and second side plates 128, 129. The first and second side plates 128, 129 and the first support plate 136 cooperate to define a first portion 138 of the channel 135 that receives the first wing plate 132, while the first and second side plates 128, 129 and the second support plate 137 cooperate to define a second portion 139 of the channel 135 that receives the second wing plate 133. As a result, the first and second portions 138, 139 of the channel 135 each has a U-like shape. In the illustrated embodiment, the first and second side plates 128, 129 and the first and second support plates 136, 137 are made of metal and are welded to each other; however, it should be appreciated that other materials and configurations are possible.

The first and second support plates 136, 137 are arranged in an abutting relationship with the first and second wing plates 132, 133. The first and second support plates 136, 137 include support plate holes 140 and the first and second wing plates 132, 133 include wing plate holes 141 that are aligned with the support plate holes 140. Connection device fasteners 142 extend through the wing plate holes 141 and the support plate holes 140 to couple the first and second wing plates 132, 133 to the first and second support plates 136, 137. In the illustrated embodiment, the connection device fasteners 142 thread into weld nuts 143 that are welded to the first and second support plates 136, 137. However, other configurations are possible where the support plate holes 140 are threaded or where holes are provided in the metal tube of the B-pillar hoop member 102. In the later example, the support plates 136, 137 could be eliminated entirely.

Each connection device fastener 142 has a shank 144 with a shank diameter d1 and each wing plate hole 141 has a hole diameter d2 that is larger than the shank diameter d1 by an oversize tolerance. The first and second side plates 128, 129 are spaced apart by a channel width W1 and the first and second wing plates 132, 133 have a wing plate width W2 that is smaller than the channel width W1 by a clearance tolerance. The oversize tolerance between the hole diameter d2 and the shank diameter d1 is larger than the clearance tolerance between the channel width W1 and the wing plate width W2 such that shear forces F are transmitted to the side plates 128, 129 of the connection device 127 instead of to the connection device fasteners 142. The connection device fasteners 142 are therefore loaded in tension only and function to clamp the first and second wing plates 132, 133 to the first and second support plates 136, 137, respectively. The oversize tolerance between the hole diameter d2 of the wing plate holes 141 and the shank diameter d1 of the connection device fasteners 142 permits limited movement of the wing plates 132, 133 within the channel 135 where the wing plates 132, 133 will contact the first or second side plate 128, 129 before the edges of the wing plate holes 141 contact the shanks 144 of the connection device fasteners 142. This limits/prevents shear forces F from being applied to the connection device fasteners 142 for improved strength and a reduced failure rate of the connection device fasteners 142.

Figure 6:
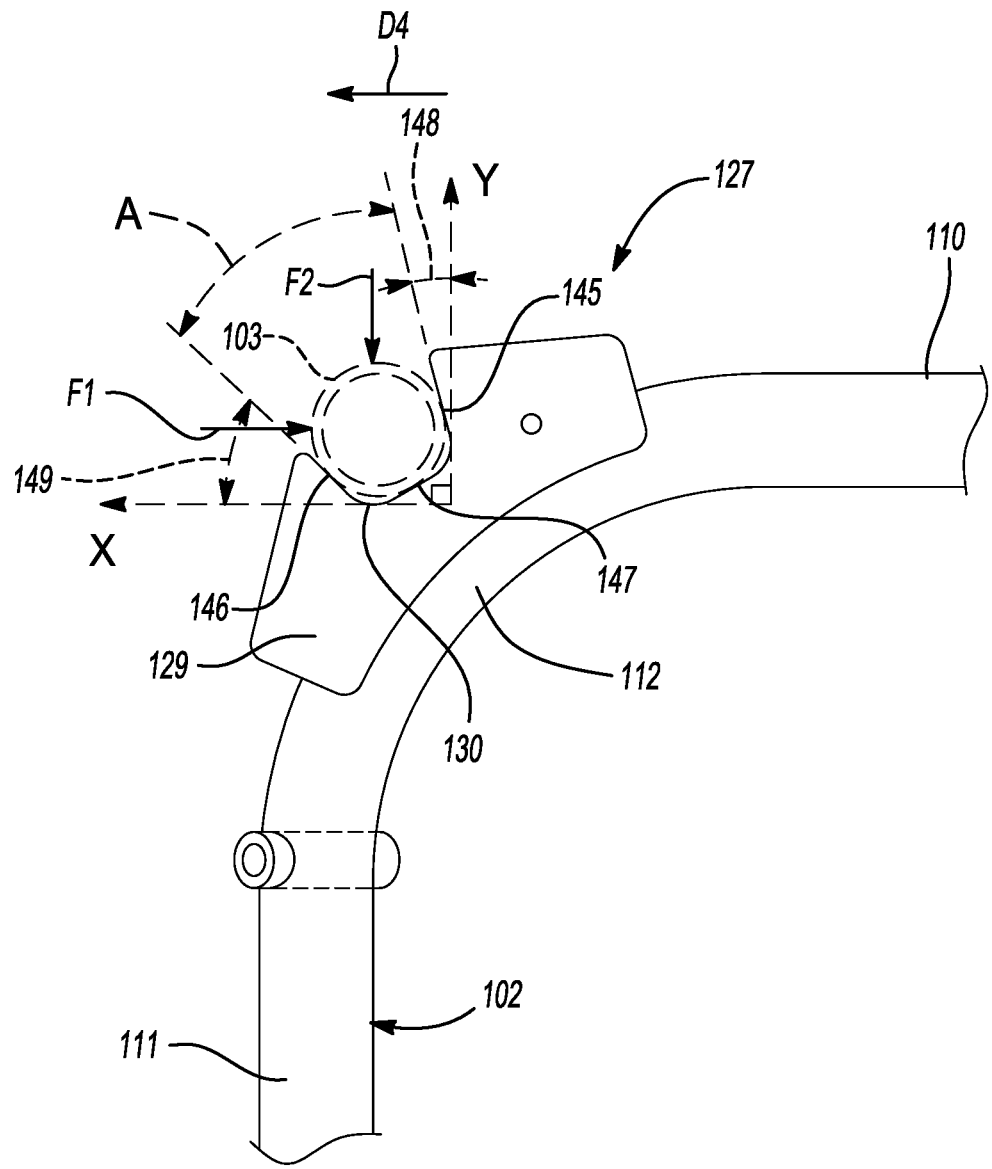
FIG. 6 is a rear elevation view of the exemplary connection device shown in FIG. 4.

With additional reference to FIG. 6, the cut-outs 130 in the first and second side plates 128, 129 have an inboard edge 145, an outboard edge 146, and a bottom edge 147, which are arranged to give the cut-outs 130 a C-like shape. The inboard edge 145 of each cut-out 130 is positioned closer to the middle cross-bar 110 of the B-pillar hoop member 102 and is therefore closer to the center line 118 of the vehicle than the outboard edge 146. The outboard edge 146 of each cut-out 130 is positioned closer to the B-pillar stanchion 111 of the B-pillar hoop member 102 and is therefore further away from the center line 118 of the vehicle than the inboard edge 145. The bottom edge 147 of each cut-out 130 extends between the inboard and outboard edges 145, 146. It should be appreciated that the inboard, outboard, and bottom edges 145, 146, 147 of the cut-outs 130 may or may not be straight.

The inboard edge 145 of each cut-out 130 is arranged at an undercut angle 148 relative to a vertical axis Y moving in a direction D4 away from the center line 118 of the vehicle. As a result, an outermost extent of the inboard edge 145 is spaced further away from the center line 118 of the vehicle than an inner most extent of the inboard edge 145. The undercut angle 148 ranges from 0 to 40 degrees and preferably from 5 to 40 degrees such that the inboard edge 145 of each cut-out 130 pushes the longitudinal member 103 inwardly toward the B-pillar hoop member 102 when external forces F1 are applied to the longitudinal member 103 in a substantially horizontal direction. The outboard edge 146 of each cut-out 130 is arranged at an incline 149 relative to a horizontal axis X such that the outboard edge 146 of each cut-out 130 pushes the longitudinal member 103 inwardly toward the B-pillar hoop member 102 when external forces F2 are applied to the longitudinal member 103 in a substantially downward vertical direction. The incline 149 ranges from 0 to 70 degrees and preferably from 5 to 70 degrees. Once fully assembled, the metal tube of the longitudinal member 103 is supported in each cut-out 130 by at least one point of contact along the bottom edge 147 and at least one point of contact along one of the inboard or outboard edges 145, 146. The size of cut-out angle A between the inboard edge 145 and the outboard edge 146 is dictated by the outer diameter (OD) of the longitudinal member 103.

Unlike fully-welded roll cages, the vehicle roll over protection system 100 disclosed herein is easy to assemble, and if necessary, disassemble. The vehicle roll over protection system 100 of the present disclosure is therefore well-suited for assembly-line manufacturing environments and does not require welding operations during installation. For example, the vehicle roll over protection system 100 may be installed in a vehicle by bolting the A-pillar and B-pillar hoop members 101, 102 to the vehicle. The longitudinal members 103 can be installed by sliding the forward ends 116 of the longitudinal members 103 over the posts 123 on the A-pillar hoop member 101, followed by bringing the longitudinal members 103 in from the sides of the vehicle into the cradles 131 in the first pair of connection devices 127 until the first and second wing plates 132, 133 are received within the channels 135 in the first pair of connection devices 127. The forward fasteners 126 and the connection device fasteners 142 can then be installed and the feet 121 at the aft ends 117 of the longitudinal members 103 can be bolted to the vehicle.

The slip connections 122 coupling the longitudinal members 103 and the A-pillar hoop member 101 and the first pair of connection devices 127 coupling the longitudinal members 103 and the B-pillar hoop member 102 accommodate dimensional variances from vehicle to vehicle without sacrificing strength, particularly because the first pair of connection devices are configured to take shear stresses off the connection device fasteners 142. The loose tolerances between components also means that the entire vehicle roll over protection system 100 can be painted, including the interfaces at the slip connections 122 and the connection devices 127. The connection devices 127 also couple the longitudinal members 103 to the B-pillar hoop member 102 without exerting clamping forces on the metal tube forming the B-pillar hoop member 102, which can weaken a thin-walled tube.

It should be appreciated that a variation of this design is possible where the configuration of the connection devices 127 between the longitudinal members 103 and the B-pillar hoop member 102 is reversed. In accordance with this alternative embodiment, the first and second side plates 128, 129 are rigidly fixed on opposing sides of each longitudinal member 103, the cradles 131 are configured to receive portions of the B-pillar hoop member 102, and the first and second wing plates 132, 133 are fixed to and extend outwardly from the B-pillar hoop member 102.

Figure 7:
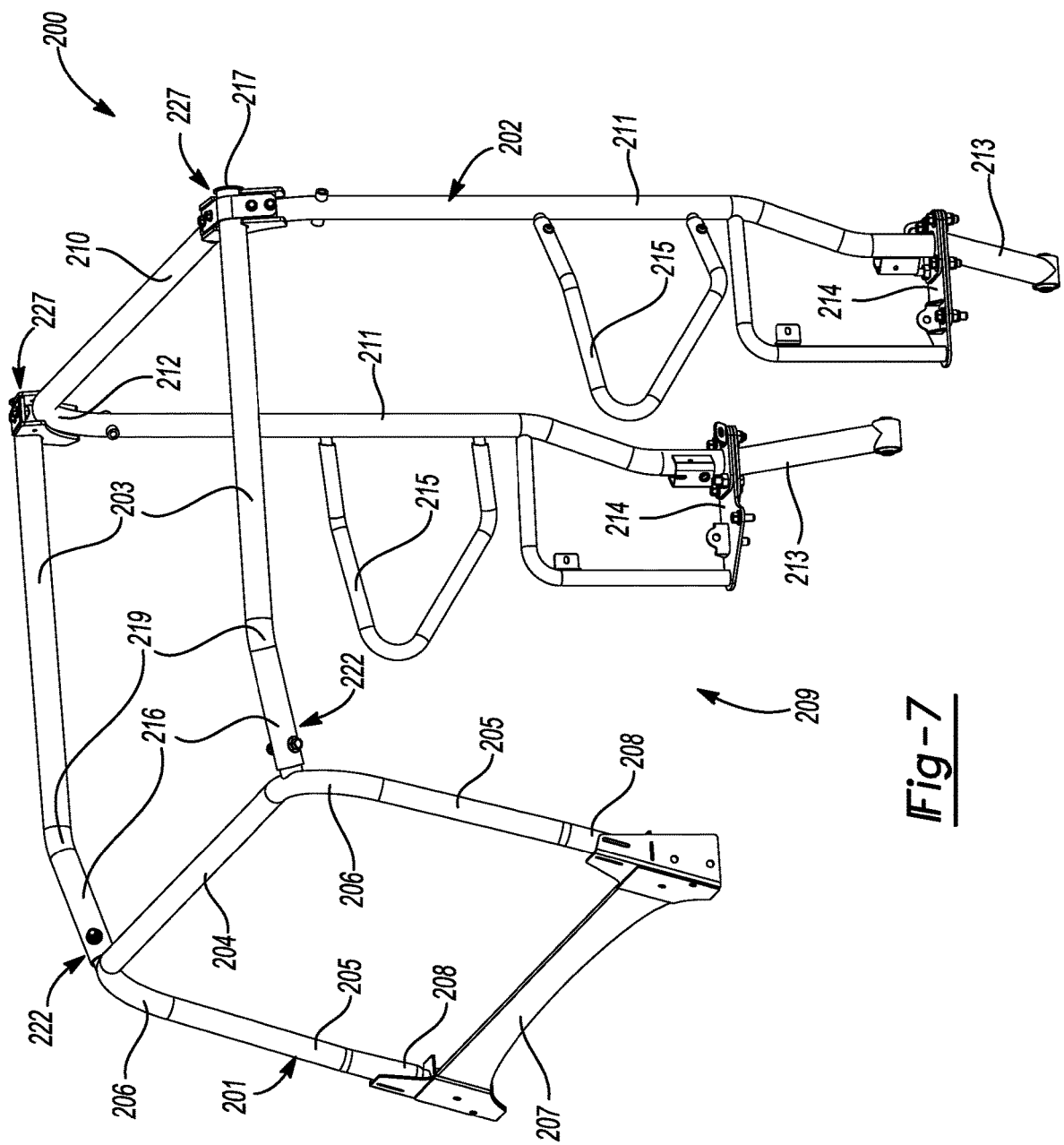
FIG. 7 is a side perspective view of another exemplary vehicle roll over protection system that has been constructed in accordance with the teachings of the present disclosure.
Figure 8:
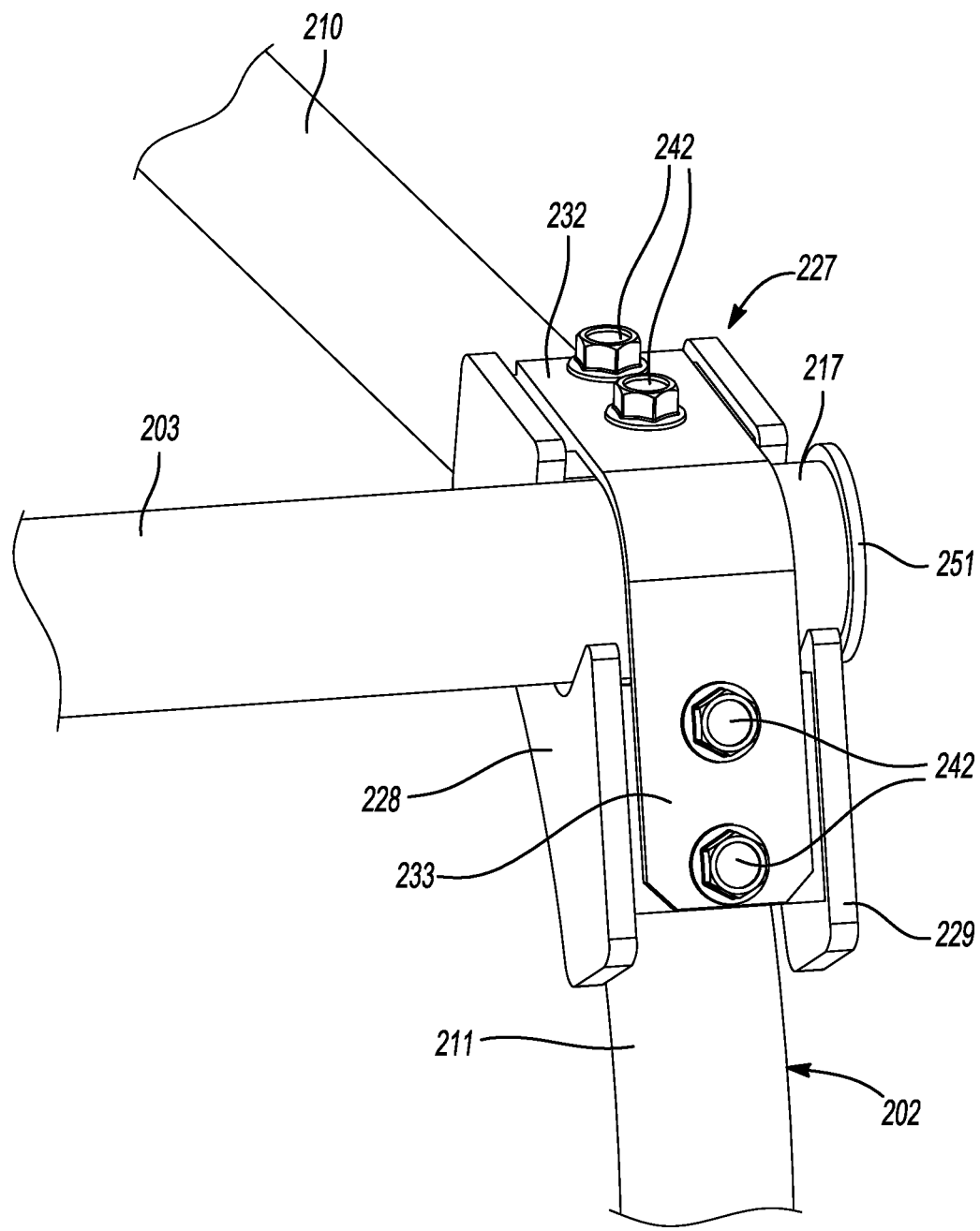
FIG. 8 is a side perspective view of an exemplary slip connection of the vehicle roll over protection system shown in FIG. 7.
Figure 9:
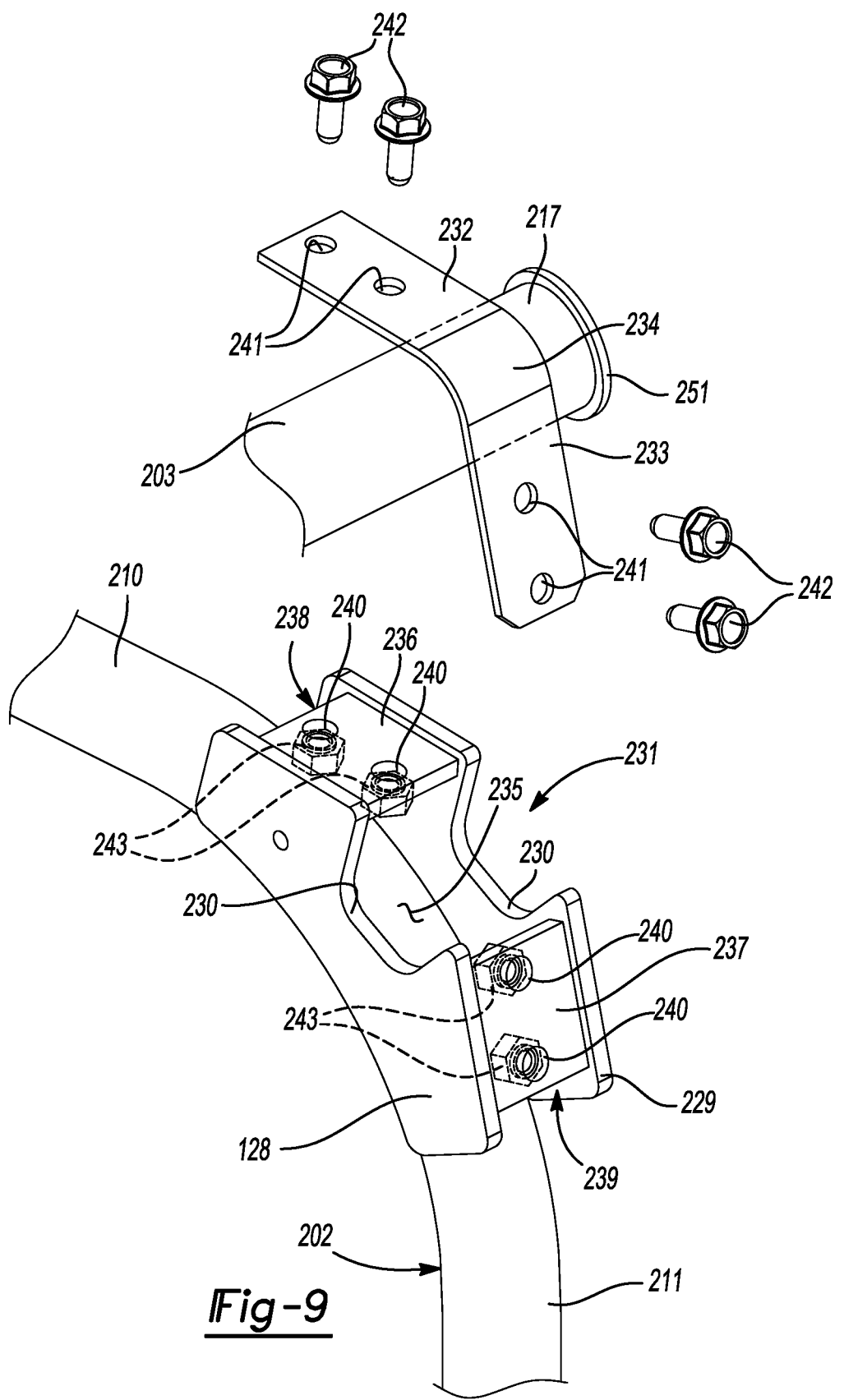
FIG. 9 is an exploded perspective view of the exemplary slip connection shown in FIG. 8.

With reference to FIGS. 7-9, another vehicle roll over protection system 200 is illustrated. Many of the elements of the vehicle roll over protection system 100 shown in FIGS. 1-6 are the same or substantially the same as the elements of the vehicle roll over protection system 200 shown in FIGS. 7-9, except as noted below. Equivalent elements shared between the embodiments have corresponding reference numbers where 100's have been used to identify the elements of the vehicle roll over protection system 100 shown in FIGS. 1-6 and 200's have been used to identify the elements of the vehicle roll over protection system 200 shown in FIGS. 7-9. For example, reference number 101 has been used to identify the A-pillar hoop member in FIG. 1, while reference number 201 has been used to identify the A-pillar hoop member in FIG. 7. Accordingly, the above description of common elements applies equally to this embodiment and will not be repeated below.

In FIGS. 7-9, the forward ends 216 of longitudinal members 203 are connected to the A-pillar hoop members 201 by slip connections 222. These slip connections 222 have the same arrangement and structure as those described above. However, in accordance with this embodiment, the longitudinal members 203 are truncated and do not have the downward sloping aft portions 120 shown in FIG. 1. Instead, the aft ends 217 of the longitudinal members 203 in FIGS. 7-9 terminate just aft of the B-pillar hoop member 202. As a result, the longitudinal members 203 do not obstruct the area behind the B-pillar hoop member 202. Accordingly, this arrangement is particularly well suited for vehicles that have a cargo bed behind the first row of passenger seats. The aft ends 217 of the longitudinal members 203 are connected to the B-pillar hoop member 202 by a first pair of connection devices 227. The first pair of connection devices 227 have the same arrangement and structure as those described above. However, in accordance with this design, the aft end 217 of each longitudinal member 203 includes a flange 251 that extends radially outwardly from the longitudinal member 203 at a position adjacent to the second side plate 229 of the first connection device 227. These flanges 251 can also act as displacement limiting features where contact between the flanges 251 and the second side plates 229 limit relative movement between the longitudinal members 203 and the B-pillar hoop member 202.

Figure 10:
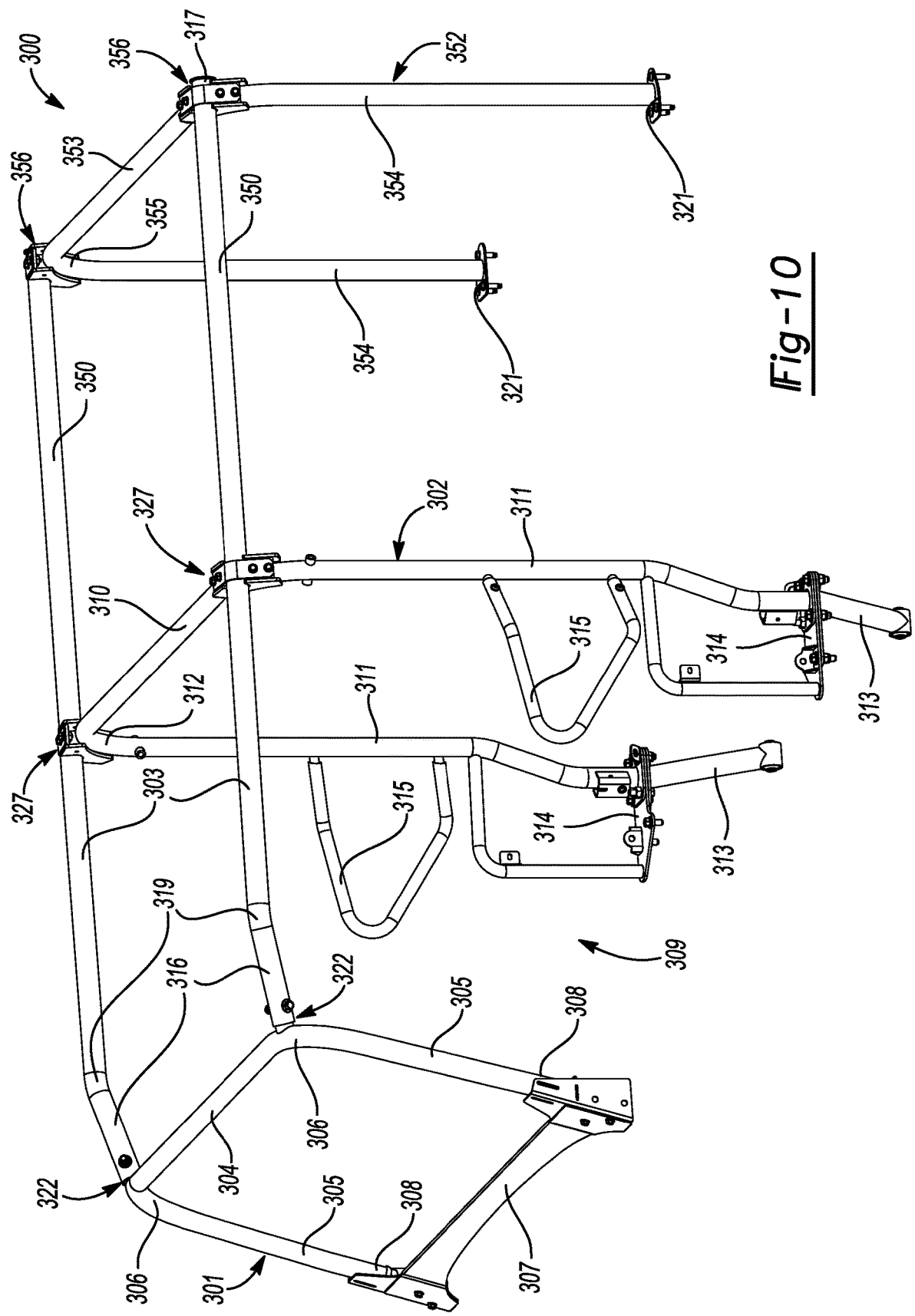
FIG. 10 is a side perspective view of another exemplary vehicle roll over protection system that has been constructed in accordance with the teachings of the present disclosure.

With reference to FIG. 10, another vehicle roll over protection system 300 is illustrated. Many of the elements of the vehicle roll over protection systems 100, 200 shown in FIGS. 1-6 and FIGS. 7-9 are the same or substantially the same as the elements of the vehicle roll over protection system 300 shown in FIG. 10, except as noted below. Equivalent elements shared between the embodiments have corresponding reference numbers where 100's have been used to identify the elements of the vehicle roll over protection system 100 shown in FIGS. 1-6, 200's have been used to identify the elements of the vehicle roll over protection system 200 shown in FIGS. 7-9, and 300's have been used to identify the elements of the vehicle roll over protection system 300 shown in FIG. 10. For example, reference number 101 has been used to identify the A-pillar hoop member in FIG. 1, while reference number 201 has been used to identify the A-pillar hoop member in FIG. 7 and reference number 301 has been used to identify the A-pillar hoop member in FIG. 10. Accordingly, the above description of common elements applies equally to this embodiment and will not be repeated below.

In FIG. 10, the forward ends 316 of longitudinal members 303 are connected to the A-pillar hoop members 301 by slip connections 322. These slip connections 322 have the same arrangement and structure as those described above. However, in accordance with this embodiment, the longitudinal members 303 do not have the downward sloping aft portions 120 shown in FIG. 1. Instead, the longitudinal members 303 in FIG. 10 have substantially straight aft portions 350 and aft ends 317 that terminate just aft of a C-pillar hoop member 352. The C-pillar hoop member 352 includes an aft cross-bar 353 that extends between C-pillar stanchions 354. The aft cross-bar 353 and the C-pillar stanchions 354 meet at corners 355 of the C-pillar hoop member 352, which may also be made of a single metal tube that is bent at corners 355. The C-pillar stanchions 354 include feet 321 that are configured to be rigidly connected to the vehicle by bolts or other fasteners at a location behind a second row of passenger seats (not shown). For example, the feet 321 of the C-pillar stanchions 354 may be configured to be bolted to the body, floor, cargo bed, or frame of the vehicle. Accordingly, this arrangement is particularly well suited for vehicles that have a second row of passenger seats behind the first row of passenger seats.

The longitudinal members 303 in the vehicle roll over protection system 300 illustrated in FIG. 10 are connected to the B-pillar hoop member 302 by a first pair of connection devices 327. The first pair of connection devices 327 have the same arrangement and structure as those described above. The aft ends 317 of the longitudinal members 303 are connected to the C-pillar hoop member 352 by a second pair of connection devices 356 located at the corners 355 of the C-pillar hoop member 352. The second pair of connection devices 356 have the same structure as the first pair of connection devices 327 and the aft ends 317 of the longitudinal members 303 include flanges 351. These flanges 351 extend radially outwardly from the longitudinal members 303 at positions adjacent to aft side plates 329 (i.e., the second side plates 329) of the second pair of connection devices 356.

The roll over protection systems disclosed herein offer the additional advantage of sharing many standardized components among the different configurations shown in FIGS. 1-10. The A-pillar hoop members 101, 201, 301, B-pillar hoop members 102, 202, 302, slip connections 122, 222, 322, connection devices 127, 237, 337, and wing plates 132, 133, 232, 233, 332, 333 on all three designs are the same. Only different longitudinal members 103, 203, 303 are used, and in the case of the configuration shown in FIG. 10, a C-pillar hoop member 352 is added. Because the different configurations share many standardized components, the manufacturing and assembly costs associated with producing different variants is significantly reduced. The modular nature of the vehicle roll over protection systems 100, 200, 300 also provide space saving benefits when in a disassembled state, requiring less storage space in a warehouse or manufacturing floor and can be shipped more easily and cheaply compared to fully-welded roll cages, which take up much more space.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle roll over protection system comprising:
   a hoop member including a first end and a second end;
   a longitudinal member including a first end and a second end;
   a connection device coupling said longitudinal member to said hoop member, wherein uninterrupted portions of the hoop member and the longitudinal member intermediate their first and second ends are overlapped at the connection device;
   said connection device including first and second side plates fixedly attached on opposing sides of said hoop member in a substantially parallel arrangement to define a channel therebetween;
   each of said first and second side plates including a cut-out that forms a cradle in said connection device;
   said longitudinal member being received in said cradle of said connection device and including a wing plate that is fixed to said longitudinal member; and
   said wing plate of said longitudinal member being received in said channel between said first and second side plates, wherein said connection device restricts relative movement between said longitudinal member and said hoop member, said first and second side plates limiting the displacement of said longitudinal member relative to said hoop member after said connection device allows relative movement between said longitudinal member and said hoop member.

2. The vehicle roll over protection system as set forth in claim 1, wherein said connection device includes a support plate that extends between said first and second side plates, said first and second side plates and said support plate cooperating to define said channel.

3. The vehicle roll over protection system as set forth in claim 2, wherein said support plate is arranged in an abutting relationship with said wing plate and includes a support plate hole that receives a connection device fastener coupling said wing plate to said support plate.

4. The vehicle roll over protection system as set forth in claim 3, wherein said connection device fastener has a shank with a shank diameter and wherein said wing plate has a wing plate hole with a hole diameter that is larger than said shank diameter by an oversize tolerance.

5. The vehicle roll over protection system as set forth in claim 4, wherein said first and second side plates are spaced apart by a channel width and wherein said wing plate has a wing plate width that is smaller than said channel width by a clearance tolerance.

6. The vehicle roll over protection system as set forth in claim 5, wherein said oversize tolerance between said hole diameter and said shank diameter is larger than said clearance tolerance between said channel width and said wing plate width such that said wing plate will contact one of said first and second side plates before an edge of said wing plate hole contacts said shank of said connection device fastener.

7. The vehicle roll over protection system as set forth in claim 1, wherein said cut-outs in said first and second side plates have an inboard edge, an outboard edge, and a bottom edge extending between said inboard and outboard edges.

8. The vehicle roll over protection system as set forth in claim 7, wherein said inboard edge of each cut-out is arranged at an undercut angle relative to a vertical axis such that an outermost extent of said inboard edge is spaced further away from a center line of the vehicle than an inner most extent of said inboard edge, said undercut angle ranging from 0 to 40 degrees such that said inboard edge of each cut-out pushes said longitudinal member inwardly toward said hoop member when external forces are applied to said longitudinal member in a horizontal direction.

9. The vehicle roll over protection system as set forth in claim 8, wherein said outboard edge of each cut-out is arranged at an incline relative to a horizontal axis such that said outboard edge of each cut-out pushes said longitudinal member inwardly toward said hoop member when external forces are applied to said longitudinal member in a downward vertical direction.

10. A vehicle roll over protection system comprising:
a hoop member;
a longitudinal member;
a connection device coupling said longitudinal member to said hoop member;
said connection device including first and second side plates fixedly attached on opposing sides of said hoop member in a substantially parallel arrangement to define a channel therebetween;
each of said first and second side plates including a cut-out that forms a cradle in said connection device;
said longitudinal member being received in said cradle of said connection device and including first and second wing plates that are fixed to said longitudinal member, said first wing plate extending along a different plane than said second wing plate; and
said first and second wing plates of said longitudinal member being received in said channel between said first and second side plates, wherein said first and second side plates are displacement limiting features that limit the displacement of said longitudinal member relative to said hoop member in multiple directions.

11. The vehicle roll over protection system as set forth in claim 10, wherein said connection device includes first and second support plates that extend between said first and second side plates on opposing sides of said cradle, said first and second side plates and said first support plate cooperating to define a first portion of said channel that receives said first wing plate, and said first and second side plates and said second support plate cooperating to define a second portion of said channel that receives said second wing plate.

12. The vehicle roll over protection system as set forth in claim 11, wherein said first and second support plates are arranged in an abutting relationship with said first and second wing plates and include support plate holes that receive connection device fasteners coupling said first and second wing plates to said first and second support plates.

13. The vehicle roll over protection system as set forth in claim 12, wherein each of said connection device fasteners has a shank with a shank diameter and wherein said first and second wing plates have wing plate holes, each having a hole diameter that is larger than said shank diameter by an oversize tolerance.

14. The vehicle roll over protection system as set forth in claim 13, wherein said first and second side plates are spaced apart by a channel width and wherein said first and second wing plates have a wing plate width that is smaller than said channel width by a clearance tolerance.

15. The vehicle roll over protection system as set forth in claim 14, wherein said oversize tolerance between said hole diameter and said shank diameter is larger than said clearance tolerance between said channel width and said wing plate width such that said first and second wing plates transmit shear forces to said side plates of said connection device instead of to said connection device fasteners.

16. A vehicle roll over protection system comprising:
an A-pillar hoop member;
a B-pillar hoop member;
a longitudinal member extending between a forward end and an aft end;
a slip connection coupling said forward end of said longitudinal member to said A-pillar hoop member;
a first connection device coupling said longitudinal member to said B-pillar hoop member at a location between said forward and aft ends of said longitudinal member;
said first connection device including first and second side plates fixedly attached on opposing sides of said B-pillar hoop member in a substantially parallel arrangement to define a channel therebetween;
each of said first and second side plates including a cut-out that forms a cradle in said first connection device;
said longitudinal member being received in said cradle of said first connection device and including a wing plate that is fixed to said longitudinal member; and
said wing plate of said longitudinal member being received in said channel between said first and second side plates, wherein said first and second side plates are displacement limiting features that limit the displacement of said longitudinal member relative to said B-pillar hoop member in multiple directions.

17. The vehicle roll over protection system as set forth in claim 16, wherein said slip connection includes a post fixed to and extending from said A-pillar hoop member, said post being received in said forward end of said longitudinal member in a slip fit.

18. The vehicle roll over protection system as set forth in claim 17, wherein said post includes an elongated post hole, wherein said forward end of said longitudinal member includes a cross-bore that is aligned with said elongated post hole, and wherein said slip connection includes a forward fastener that extends through said cross-bore in said longitudinal member and said elongated post hole to couple said forward end of said longitudinal member to said A-pillar hoop member.

19. The vehicle roll over protection system as set forth in claim 16, wherein said aft end of said longitudinal member includes a flange that extends radially outwardly from said longitudinal member at a position adjacent to said second side plate of said first connection device.

20. The vehicle roll over protection system as set forth in claim 16, further comprising:
a C-pillar hoop member;
a second connection device coupling said aft end of said longitudinal member to said C-pillar hoop member;
said second connection device having the same structure as said first connection device; and
said aft end of said longitudinal member including a flange that extends radially outwardly from said longitudinal member at a position adjacent to an aft side plate of said second connection device.

* * * * *